United States Patent [19]

Mize

[11] 3,904,081
[45] Sept. 9, 1975

[54] CONVEYOR APPARATUS UTILIZING SKIP BUCKET

[75] Inventor: Erbie Gail Mize, Chattanooga, Tenn.

[73] Assignee: Astec Industries, Inc., Chattanooga, Tenn.

[22] Filed: May 2, 1974

[21] Appl. No.: 466,138

[52] U.S. Cl. ................ 222/63; 198/24; 222/361
[51] Int. Cl.² ........................................ B67D 3/00
[58] Field of Search ........... 222/361, 353, 354, 355, 222/334, 333, 63; 141/190, 98, 284; 177/62, 151; 214/623–629; 198/24

[56] References Cited
UNITED STATES PATENTS

| 434,467 | 8/1890 | Riley | 222/354 X |
|---|---|---|---|
| 533,834 | 2/1895 | Wind | 222/361 X |
| 1,482,467 | 2/1924 | Harrington | 141/190 X |
| 2,634,887 | 4/1953 | Haeger | 222/354 X |
| 2,708,054 | 5/1955 | Rose et al. | 222/354 X |

FOREIGN PATENTS OR APPLICATIONS

| 962,185 | 7/1964 | United Kingdom | 222/361 |
|---|---|---|---|
| 1,183,001 | 12/1964 | Germany | 222/361 |
| 530,138 | 7/1954 | Belgium | 222/361 |

*Primary Examiner*—Robert B. Reeves
*Assistant Examiner*—Hadd Lane

[57] ABSTRACT

Skip bucket conveyor apparatus for conveying a material such as asphalt aggregate mix. The conveyor apparatus includes a skip bucket having an upper material receiving opening, a lower material discharge opening, and a discharge gate which automatically operates for selective blocking and unblocking of the material discharge opening. Movement of skip bucket is controlled in response to supply of material to be conveyed by the apparatus.

3 Claims, 3 Drawing Figures

PATENTED SEP 9 1975          3,904,081

CONVEYOR APPARATUS UTILIZING SKIP BUCKET

This invention relates in general to conveying apparatus and in particular to skip bucket conveying apparatus for handling a material such as asphalt aggregate.

There are numerous instances in the handling of materials in bulk where it is necessary to convey material between two locations which may be spaced apart only a short distance from each other. A specific example of such an instance is found in plants for producing asphalt aggregate material of the type used in paving construction. Asphalt aggregate plants typically use a mixing device such as a pugmill for the purpose of intermixing asphalt and aggregate materials. The conventional pugmill mixing apparatus has a bottom discharge opening covered by a gate which can be opened to discharge a batch of the mixed product from the pugmill. The mixed asphalt aggregate product discharged from the pugmill is typically conveyed to another location for further treatment or for temporary storage.

Those skilled in the art are aware that the physical characteristics of pugmill mixing apparatus, especially as adapted for use in the manufacture of asphalt aggregate material, do not readily permit the asphalt aggregate material discharged from the bottom of the pugmill to be directly received in the inlet hopper of an elevator conveyor typically used to convey the asphalt aggregate material to an elevated location appropriate for transfer into a storage bin, for example. The problem of transferring asphalt aggregate mix from the pugmill discharge outlet to the inlet hopper of a subsequent conveyor has been met, in the prior art, with known expedients such as screw conveyors or drag chain conveyors. Such prior art expedients, while reasonably effective to accomplish the desired conveyance of asphalt aggregate mix a short distance from the outlet of a pugmill mixer to the inlet hopper of an elevator conveyor or other apparatus, are expensive to manufacture and typically require frequent and expensive maintenance. Both the screw conveyor and the drag chain conveyor, for example, provide material conveying action as a consequence of relative movement of a stationary member and one or more movable material displacing members. Such relative movement of closely spaced-apart components frequently results in component wear and conveyor breakdown, especially where such conveyors are used to handle material such as asphalt aggregate mix. The breakdown or maintenance downtime for a conveyor, an apparatus which may comprise a relatively small component of the overall asphalt aggregate plant, nevertheless causes the entire plant to be inoperative during the time the conveyor is inoperative.

Accordingly, it is an object of the present invention to provide an improved conveyor apparatus.

It is another object of the present invention to provide improved conveyor apparatus for use with an asphalt aggregate plant.

It is still another object of the present invention to provide an improved apparatus for conveying asphalt aggregate material.

Other objects and advantages of the present invention will become more readily apparent from the following description of a preferred embodiment, including the drawings wherein.

Figure 1:
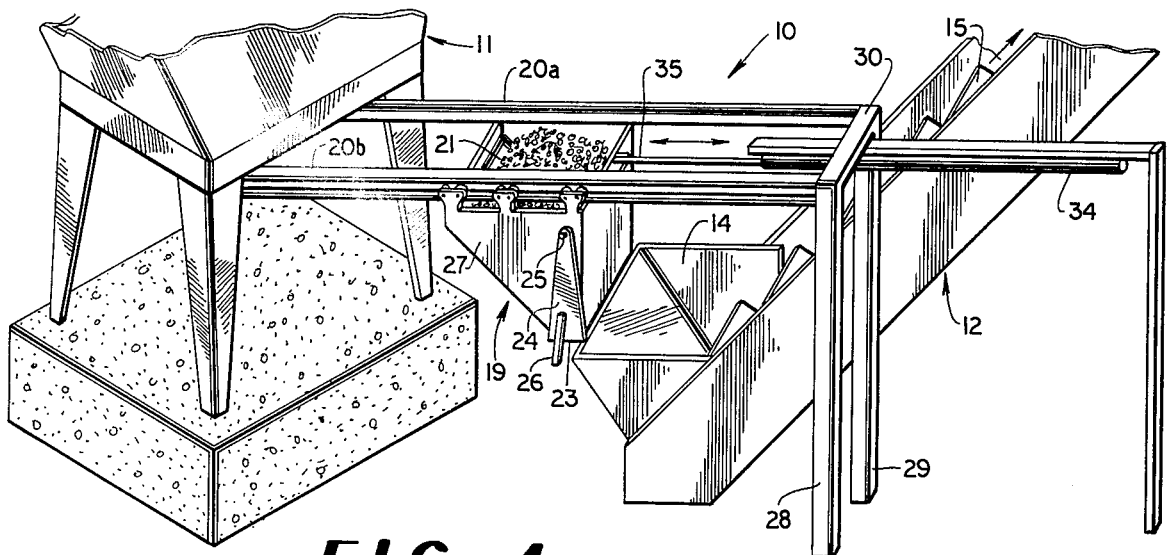
FIG. 1 shows an isometric view of conveyor apparatus according to the disclosed embodiment of the present invention.

Stated in general terms, the conveyor apparatus of the present invention includes a skip bucket which is mounted for travel along a path including a material supply location, such as the discharge opening of a pugmill mixer, and a material dump location, such as the inlet hopper of a bucket elevator. The skip bucket of the present conveyor apparatus is selectively movable along the aforementioned path to convey material from the supply location to the dumping location. The conveyor apparatus includes control means which allow the conveyor apparatus to operate unattended and in an automatic manner, in response to batch supply of material into the skip bucket.

The present invention is better understood with reference to the disclosed embodiment thereof as shown in the Figures, wherein is indicated generally at 10 a conveyor apparatus which is mounted for movement between a pugmill mixer indicated somewhat diagrammatically at 11 and a bucket elevator 12. The bottom portion 13 of the pugmill mixer 11 has a discharge opening covered by a discharge gate 39 which is selectively opened to discharge a batch of mixed material from the pugmill. The bucket elevator 12 has an inlet hopper 14 for receiving material to be conveyed; the bucket elevator has a plurality of conveyor buckets 15 which are moved through the inlet hopper 14, in a manner known to those skilled in the art, so that each of the conveyor buckets scoops up a quantity of material in the hopper and conveys the material to a discharge location at the remote elevated end of the bucket elevator.

The physical configuration and arrangement of actual pugmill mixers and bucket elevators, considered with the bucket elevator angle of elevation which is typically dictated by the height of a storage bin or other material-receiving structure positioned at the discharge end of the elevator, make it impracticable to position the pugmill mixer and bucket elevator so that the inlet hopper 14 of the bucket elevator is positioned directly beneath the discharge opening in the bottom portion of the pugmill mixer.

The relatively short distance between the pugmill mixer and the inlet hopper 14 of the bucket elevator is bridged by a skip bucket 19 suspended for travel on a pair of rails 20a and 20b. The skip bucket 19 has an upper end 21 which can be completely open to facilitate the introduction of material into the skip bucket. A discharge opening 22 is located at the bottom end of the skip bucket 19, and a discharge gate 23 is provided to block the flow of material from the discharge opening. The discharge gate 23, in the disclosed embodiment of the invention, is connected to a pair of side support members extending from the gate in a direction upwardly alongside the skip bucket for pivotal attachment at opposite sides of the skip bucket. One of the side support members for the discharge gate 23 is shown at 24 in FIGS. 1 and 2, and is pivotally attached at 25 to a side of the skip bucket; it will be understood that a corresponding side support member and pivotal attachment are present on the line side of the skip bucket. The pivotal attachments of the side support members with the skip bucket are preferably chosen so that the discharge gate 23 normally gravitates to the closed or discharge-blocking position shown in FIG. 1 and in FIG. 2 (in unbroken lines). A discharge actuating member 26 is connected to the discharge gate or to the side support members for a purpose which is explained below. The skip bucket 19 is advantageously provided with at least one side wall 27 which slopes diagonally from the open end 21 to the discharge opening 22, to facilitate the discharge flow of material from the relatively wide open top end to the relatively narrow discharge opening.

The rails 20a and 20b extend from a first end, allowing the opened top end 21 of the skip bucket 19 to be positioned beneath the pugmill mixer 11, to a second end, allowing the discharge opening 22 of the skip bucket to be positioned over the inlet hopper 14 of the bucket elevator 12. The side rails may be secured to the supporting structure of the pugmill mixer 11 at the first end, and to supporting structure such as the uprights 28 and 29 and the cross beam 30 at the second end disposed over the inlet hopper 14.

Figure 2:
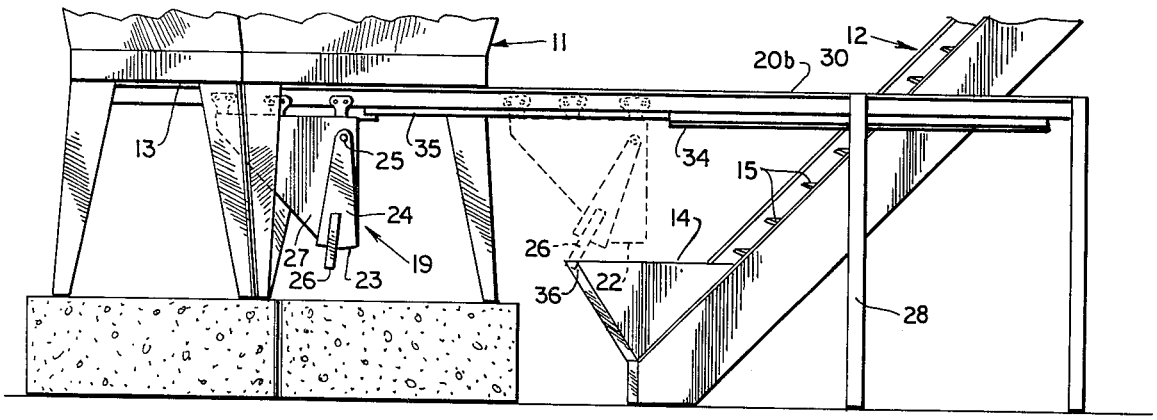
FIG. 2 shows a vertical elevation view of the apparatus depicted in FIG. 1.

Reciprocal travel of the skip bucket 19 between the loading position shown in unbroken line in FIG. 2, and the discharge position shown in broken line in FIG. 2, is accomplished in the disclosed embodiment with a linear actuating device such as the hydraulic cylinder 34 connected to the cross beam 30 and having an operating rod 35 connected to the skip bucket 19. The operating stroke of the hydraulic cylinder 34 must be at least sufficient to accomplish the desired extent of reciprocal travel of the skip bucket. In the case where a linear actuator such as a cylinder (whether hydraulic or pneumatic) is used to reciprocate the skip bucket, it is preferable that the actuator have the depicted relation with the skip bucket so that the pulling force of the actuator is exerted on the loaded bucket. This pulling arrangement minimizes the possibility that the actuator might be damaged while attempting to push a fully-loaded skip bucket as the operating rod approached its maximum extension from the cylinder.

Referring now to FIG. 2, it is seen that the skip bucket 19 is placed in the loading position (shown in unbroken lines) by appropriate actuation of the cylinder 34 to the extended position. After a load of asphalt mix material is discharged from the pugmill mixer into the open top end 21 of the skip bucket 19, the cylinder 34 is actuated to retract the skip bucket 19 to the discharge position (shown in broken line in FIG. 2). As the discharge opening 22 of the skip bucket 19 approaches the discharge position over the inlet hopper 14, the discharge actuating member 26 moves into contact with a stationary object such as the forward edge 36 of the hopper 14. The discharge gate 23 is pivotally moved away from discharge blocking relation with the discharge opening 22, so that the material carried by the skip bucket is immediately and automatically discharged into the hopper 14. The skip bucket 19 is thereafter returned to the load-receiving position beneath the pugmill mixer, by appropriate actuation of the cylinder 34 to the extended position.

The material transferring operation of the skip bucket 19 is preferably coordinated with the batch discharge operation of the pugmill mixer 11 in a manner as described with reference to FIG. 3. The pugmill mixer 11 typically has a material discharge gate 39 which is selectively moved between the closed or flow-blocking position (shown in FIG. 3) and an open position by means of a suitable actuator 40, which may conveniently be provided by a hydraulic or pneumatic cylinder. The control operation of the mixer gate actuator 40 is known to those skilled in the art and is not described further herein. The hydraulic cylinder 34 associated with the skip bucket 19 can be a conventional double-action cylinder connected by the lines 41 and 42 to a control valve 43, which is supplied with hydraulic operating fluid from a pressure source 44 such as a hydraulic pump apparatus of appropriate capacity. Those skilled in the art will recognize that the control valve 43 is selectively operable to alternative control positions supplying the cylinder 34 with operating fluid respectively to extend or to retract the operating rod 35 of the cylinder 34.

Control input to the control valve 43 is provided in response to a gate position sensor 45 which provides an output signal condition along the line 46 to a time delay circuit 47, in response to the discharge gate 39 of the pugmill mixer 11 becoming closed to block further discharge of material from the mixer. The gate position sensor 45 may be positioned for actuation by a trip member 48 connected with the operating rod 40' of the actuator 40, by way of example. The gate position sensor 45 may be alternatively actuated by direct contact with the gate 39, or otherwise actuated in response to a condition denoting termination of material flow from the pugmill mixer 11.

Figure 3:
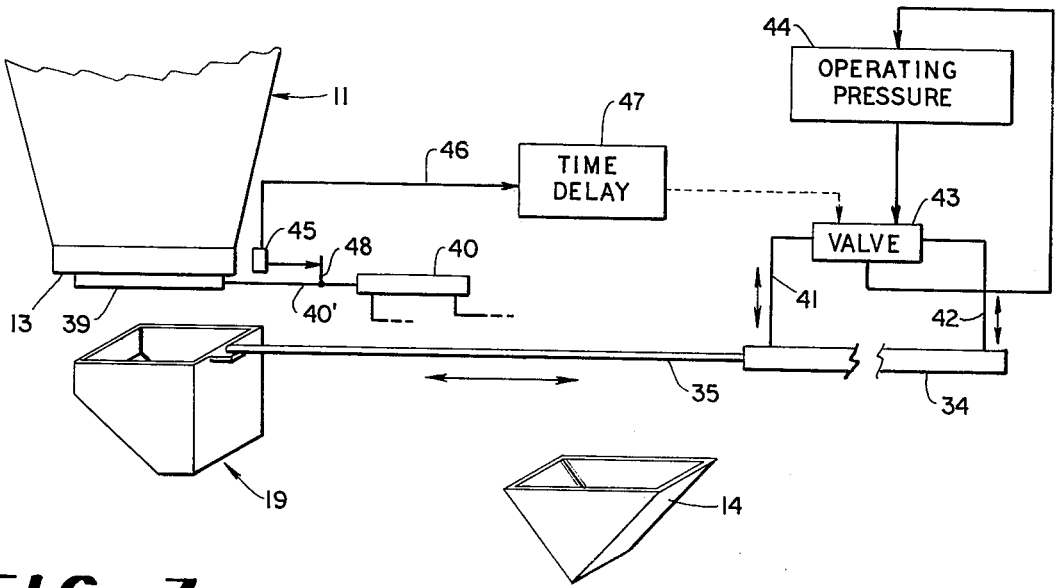
FIG. 3 is a schematic view of control apparatus used in the disclosed embodiment.

Assuming that the skip bucket 19 is positioned beneath the pugmill mixer 11, as shown in FIG. 3, a gate closure condition sensed by the gate position sensor 45 and supplied as a gate closure signal condition to the time delay circuit 47 causes an immediate operation of the control valve 43 to supply pressurized fluid along the line 41 to the cylinder 34, so that the cylinder commences retracting the skip bucket 19 toward the material dumping position above the hopper 14. The discharge gate 33 of the skip bucket automatically opens when the skip bucket is positioned over the hopper 14, as described above. A predetermined time after the gate position sensor first provided the signal condition indicating closure of the mixer gate 39, the time delay circuit 47 times out and switches control valve 43 to an operating condition supplying pressurized fluid along the line 42 to the cylinder 34, whereby the skip bucket 39 is returned to the material receiving position beneath the mixer.

An operational control arrangement having the functional characteristics described above with respect to FIG. 3 ensures that the skip bucket conveyor operates automatically, in response to each discharge of material from the pugmill mixer and without requiring manual intervention. The skip bucket 19 need remain in material discharge position over the hopper 14 only for a predetermined amount of time adequate to completely discharge material from the skip bucket, however, so that the skip bucket is automatically returned to the material receiving position without further delay or the necessity of manual operation or operator attention. This automatic return feature prevents the skip bucket 19 from being inadvertently left in position over the hopper 14. It will be apparent to those skilled in the art that operation of the pugmill mixer gate actuator 40 can be interlocked with the extended position of the skip bucket 19, to provide positive protection against inadvertent discharge of material from the mixer at a time when the bucket 19 is not properly positioned.

It will be apparent that the foregoing relates only to a preferred embodiment of the present invention, and that numerous alterations and modifications may be made therein without departing from the spirit and the scope of the invention as set forth in the following claims.

What is claimed is:

1. Apparatus for mixing and conveying batches of material, comprising in combination:

mixing means operative to receive and mix material by the batch, and including a selectively operable batch discharge gate;

means responsive to closure of said batch discharge gate to provide a signal condition;

a material receiving means positioned in laterally spaced apart relation to said batch discharge gate;

track means extending from a first location proximate said batch discharge gate to a second location proximate said material receiving means;

receptacle means mounted for movement along said track means, said receptacle means having an open upper portion which is positioned below said batch discharge gate to receive material flowing through said open batch discharge gate when said receptacle means is at said first location, and said receptacle means having a lower opening which is positioned above said material receiving means when said receptacle means is at said second location;

discharge gate actuating means selectively operative to open said batch discharge gate at a time when said receptacle means is at said first location;

gate means associated with said receptacle means and normally positioned to block said lower opening, said gate means being biassed to said normal position and being selectively displaceable therefrom in response to said receptacle means arriving at said second location;

motive means connected to said receptacle means and selectively operative to move said receptacle along said track means to either of said first and second locations;

said motive means being responsive to said signal condition to move said receptacle means from said first location to said second location; and means operative to control said motive means to return said receptacle means from said second location to said first location after discharge of material from said receptacle means.

2. Apparatus as in claim 1, wherein said last mentioned means includes timing means responsive to said signal condition and operative to effect said return a predetermined amount of time after said signal condition is provided in response to closure of said batch discharge gate.

3. Apparatus as in claim 1, wherein:

said track means extends substantially linearly between said first and second locations; and said motive means comprises a linear actuator means having an operating rod which is selectively extendable and retractable, said operating rod being connected to pull said receptacle means toward said second location when said operating rod is being retracted.

* * * * *